US011544834B2

(12) United States Patent
Takahashi (10) Patent No.: US 11,544,834 B2
(45) Date of Patent: Jan. 3, 2023

(54) INFORMATION PROCESSING SYSTEM FOR EXTRACTING IMAGES, IMAGE CAPTURING APPARATUS, INFORMATION PROCESSING APPARATUS, CONTROL METHODS THEREFOR, AND STORAGE MEDIUM

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 17/162,943

(22) Filed: Jan. 29, 2021

(65) Prior Publication Data

US 2021/0241443 A1 Aug. 5, 2021

(30) Foreign Application Priority Data

Feb. 3, 2020 (JP) .............................. JP2020-016493

(51) Int. Cl.
*G06T 7/00* (2017.01)
*H04N 5/232* (2006.01)
*G06V 40/16* (2022.01)

(52) U.S. Cl.
CPC .......... *G06T 7/0002* (2013.01); *G06V 40/175* (2022.01); *H04N 5/23222* (2013.01);
(Continued)

(58) Field of Classification Search
CPC ......... G06T 7/0002; G06T 2207/20081; G06T 2207/30168; G06T 2207/30201;
(Continued)

(56) References Cited

U.S. PATENT DOCUMENTS

2011/0280486 A1\* 11/2011 Wang .................... G06V 20/30
382/224
2015/0092997 A1\* 4/2015 Yamaguchi ............ G06V 20/30
382/118
(Continued)

FOREIGN PATENT DOCUMENTS

JP 2010-035177 A 2/2010
JP 2018-045350 A 3/2018

*Primary Examiner* — Gevell V Selby
(74) *Attorney, Agent, or Firm* — Cowan, Liebowitz & Latman, P.C.

(57) ABSTRACT

An information processing system comprises an image capturing apparatus and an information processing apparatus, the image capturing apparatus includes an image capturing device; a first evaluation unit configured to perform first evaluation on a captured image; and a first transmission unit configured to transmit the captured image to the information processing apparatus, and the information processing apparatus includes a reception unit configured to receive the captured image; a second evaluation unit configured to perform second evaluation on the captured image; and a second transmission unit configured to transmit an evaluation result to the image capturing apparatus, the image capturing apparatus further including a sorting unit configured to receive the evaluation result of the second evaluation, and sort the captured image using an evaluation results of the first evaluation and the second evaluation.

30 Claims, 9 Drawing Sheets

(52) U.S. Cl.
CPC ............. *G06T 2207/20081* (2013.01); *G06T 2207/30168* (2013.01); *G06T 2207/30201* (2013.01)

(58) Field of Classification Search
CPC ...... G06V 40/175; G06V 10/82; G06V 20/30; G06V 40/174; H04N 5/23222; H04N 5/232; H04N 5/23206; H04N 5/23245; G06K 9/6272
See application file for complete search history.

(56) References Cited

U.S. PATENT DOCUMENTS

| | | | |
|---|---|---|---|
| 2019/0087937 A1* | 3/2019 | Saito | .......................... G06T 7/20 |
| 2019/0327408 A1* | 10/2019 | Kawarada | ......... H04N 5/232133 |
| 2020/0366729 A1* | 11/2020 | Nishioka | ............... G06T 7/0002 |

* cited by examiner

| | CAMERA SCORE | SERVER SCORE | DETERMINATION |
|---|---|---|---|
| IMAGE A | 70 | 30 | DEPENDENT UPON CONDITION |
| IMAGE B | 20 | 70 | DEPENDENT UPON CONDITION |
| IMAGE C | 70 | 80 | KEEP |
| IMAGE D | 50 | 70 | DEPENDENT UPON CONDITION |
| IMAGE E | 30 | 20 | DO NOT KEEP |

FIG. 10

INFORMATION PROCESSING SYSTEM FOR EXTRACTING IMAGES, IMAGE CAPTURING APPARATUS, INFORMATION PROCESSING APPARATUS, CONTROL METHODS THEREFOR, AND STORAGE MEDIUM

BACKGROUND OF THE INVENTION

Field of the Invention

The present invention relates to an information processing system for extracting images desirable for a user from a large number of images.

Description of the Related Art

In recent years, methods of storing images on a server on a network such as a cloud (hereinafter, server or cloud) are known as a way of backing up images. The capacity of servers is on an increasing trend, making it is possible for users to directly store large numbers of images they have shot on a server. However, depending on the service provided on the server side, a fee may be charged for storing more than a predetermined volume, and thus it is desirable to back up only necessary images up to the free limit. Thus, there are calls for a mechanism that allows unwanted images to be excluded with a simple method and for being able to determine best shot images with a simple method immediately after the images are shot. Here, images that users do not consider necessary are generally images that are out of focus, images in which people don't look good, and other such images.

Japanese Patent Laid-Open No. 2010-35177 describes automatically evaluating shot images within a photographing apparatus such as a digital camera, with this evaluation being performed based on the state of exposure, bokeh, blur and other such factors. In other words, it is possible for at least exclusion of out-of-focus images to be performed in-camera. However, with this method, it is not possible to evaluate whether or not an image is agreeable to a user, or in other words, the quality of composition, facial expression and other such elements.

Also, Japanese Patent Laid-Open No. 2018-45350 describes a method of changing a scoring method of facial expression calculation with respect to a learning model for facial expression identification, according to attributes of a person targeted for identification. According to Japanese Patent Laid-Open No. 2018-45350, it is possible to at least determine images having a good facial expression, by performing estimation processing on a learning model of machine learning (AI) such as cloud. However, with this method, although it is possible to determine highly reliable best shot images with regard to facial expression, it is not possible to also determine the focus state at the same time.

Simultaneously performing both focus determination and facial expression determination in-camera immediately after shooting is difficult, and it is conceivable to also determine the quality of focus in combination with the result of utilizing a cloud-based learning model similarly to facial expression determination. However, in order to perform best shot determination processing outside the camera immediately after shooting, images need to be resized down before being transmitted, depending also on the communication environment. Sharpness softens when image size is reduced, and the possibility arises of not being able to perform correct out-of-focus determination or focus determination being performed on a portion that is not the main object. Also, focus determination performed outside the camera may be more difficult than that performed in-camera in some case, such as intended blur in areas other than the main object being mistakenly determined to be undesirable blur. As evident from the above, there is a problem in sorting images immediately after shooting when focus determination is combined with determination of elements other than focus such as composition and facial expression.

SUMMARY OF THE INVENTION

The present invention has been made in consideration of the aforementioned problems, and realizes an information processing system that keeps only images desired by a user immediately after shooting, and does not increase the volume of backup data on a server or other such device.

According to a first aspect of the present invention, there is provided an information processing system comprising an image capturing apparatus and an information processing apparatus capable of communicating with each other, wherein the image capturing apparatus includes: an image capturing device configured to capture an object image; and at least one processor or circuit configured to function as: a first evaluation unit configured to perform first evaluation on a captured image captured by the image capturing device; and a first transmission unit configured to transmit the captured image to the information processing apparatus, wherein the information processing apparatus includes: at least one processor or circuit configured to function as: a reception unit configured to receive the captured image transmitted by the first transmission unit; a second evaluation unit configured to perform second evaluation on the captured image; and a second transmission unit configured to transmit an evaluation result of the second evaluation to the image capturing apparatus, and wherein the at least one processor or circuit of the image capturing apparatus is configured to further function as a sorting unit configured to receive the evaluation result of the second evaluation, and sort the captured image using an evaluation result of the first evaluation and the evaluation result of the second evaluation.

According to a second aspect of the present invention, there is provided an image capturing apparatus capable of communicating with an information processing apparatus, comprising: an image capturing device configured to capture an object image; and at least one processor or circuit configured to function as: an evaluation unit configured to perform first evaluation on a captured image captured by the image capturing device; a transmission unit configured to transmit the captured image to the information processing apparatus; a reception unit configured to receive an evaluation result of second evaluation performed on the captured image by the information processing apparatus, and a sorting unit configured to sort the captured image, using an evaluation result of the first evaluation and the received evaluation result of the second evaluation.

According to a third aspect of the present invention, there is provided an information processing apparatus capable of communicating with an image capturing apparatus, comprising: at least one processor or circuit configured to function as: a reception unit configured to receive a captured image captured by the image capturing apparatus and transmitted to the information processing apparatus; a second evaluation unit configured to perform second evaluation that differs from first evaluation by the image capturing apparatus on the captured image; and a transmission unit configured to transmit an evaluation result of the second evaluation to the image capturing apparatus.

According to a fourth aspect of the present invention, there is provided a method of controlling an image capturing apparatus including an image capturing device for capturing an object image and capable of communicating with an information processing apparatus, the method comprising: performing first evaluation on a captured image captured by the image capturing device; transmitting the captured image to the information processing apparatus; receiving an evaluation result of second evaluation performed on the captured image by the information processing apparatus; and sorting the captured image, using an evaluation result of the first evaluation and the received evaluation result of the second evaluation.

According to a fifth aspect of the present invention, there is provided a method of controlling an information processing apparatus capable of communicating with an image capturing apparatus, the method comprising: receiving a captured image captured by the image capturing apparatus and transmitted to the information processing apparatus; performing second evaluation that differs from first evaluation by the image capturing apparatus on the captured image; and transmitting an evaluation result of the second evaluation to the image capturing apparatus.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
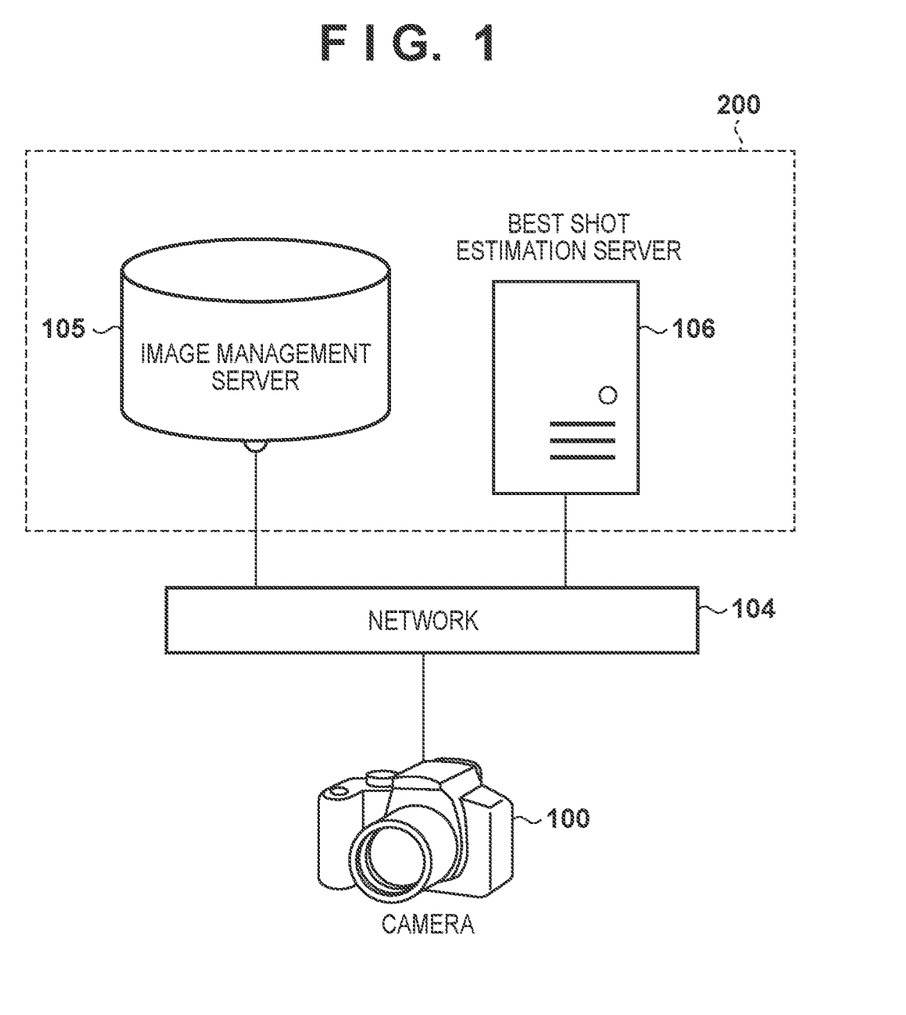
FIG. 1 is a diagram showing a configuration of an information processing system according to an embodiment of the present invention.

FIG. 1 is a diagram showing a configuration of an information processing system according to an embodiment of the present invention.

In FIG. 1, a camera 100 transmits images to an image management server 105 via a network 104. The image management server 105 transmits images to a best shot (hereinafter, may also be rendered as BS) estimation server 106 one by one, via the network 104. The best shot estimation server 106 calculates a best shot score value for input images, and sends the calculation result to the image management server 105 in return, via the network 104. The image management server 105 then notifies that information to the camera 100. Note that the image management server 105 and the best shot estimation server 106 may be constituted to exist within the same device. In the present embodiment, the image management server 105 and the best shot estimation server 106 exist within an information processing apparatus 200, and the camera 100 and the information processing apparatus 200 are capable of communicating via the network 104 or other such communication line.

Figure 2:
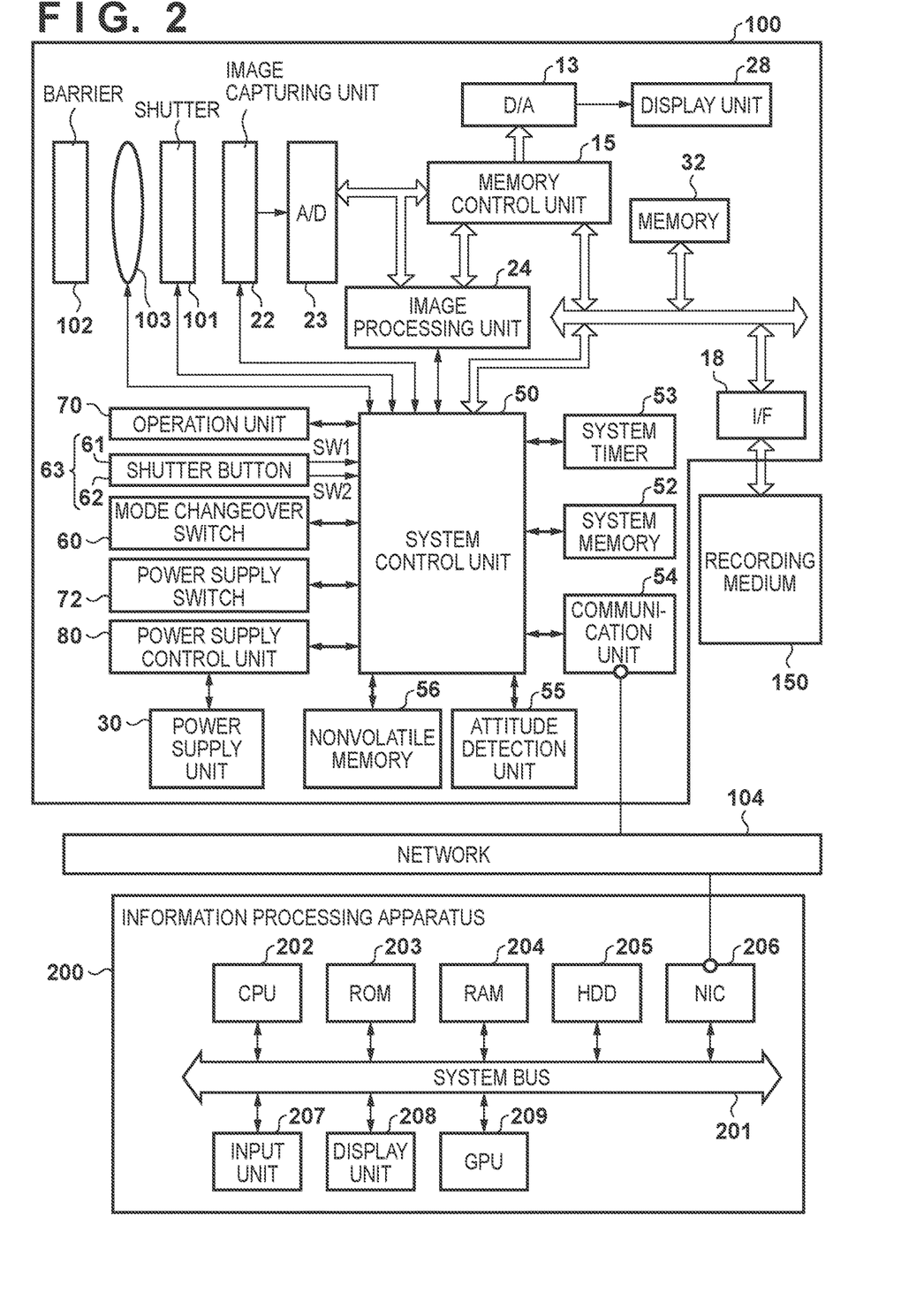
FIG. 2 is a diagram showing a hardware configuration of apparatuses constituting the information processing system.

FIG. 2 is a diagram showing a hardware configuration of the apparatuses constituting the information processing system shown in FIG. 1.

In FIG. 2, a shooting lens 103 has a lens group including a zoom lens and a focus lens. A shutter 101 is a shutter provided with an aperture function. An image capturing unit 22 is provided with an image sensor that is constituted by a CCD or CMOS device or other such image capturing device that converts optical images (object images) into electrical signals. An A/D converter 23 converts analog signals that are output by the image capturing unit 22 into digital signals. A barrier 102, by covering an image capturing system of the digital camera 100 including the shooting lens 103, prevents soiling and damage of the image capturing system including the shooting lens 103, the shutter 101 and the image capturing unit 22.

An image processing unit 24 performs predetermined pixel interpolation processing, resize processing such as reduction, color conversion processing and other such processing on data from the A/D converter 23 or data from a memory control unit 15. Also, in the image processing unit 24, predetermined computational processing is performed using captured image data, and a system control unit 50 performs exposure control and focus detection control based on obtained computation results. TTL (through-the-lens) AF (autofocus) processing, AE (auto exposure) processing, and EF (electronic flash) processing are thereby performed. The image processing unit 24 further performs predetermined computational processing using captured image data, and also performs TTL AWB (auto white balance) processing based on obtained computation results.

Output data from the A/D converter 23 is written to a memory 32 via the image processing unit 24 and the memory control unit 15 or directly via the memory control unit 15. The memory 32 stores image data obtained by the image capturing unit 22 and converted into digital data by the A/D converter 23, and image data for displaying on a display unit 28. The memory 32 is provided with sufficient storage capacity to store a predetermined number of still images or moving images and audio of a predetermined time length.

Also, the memory 32 doubles as a memory for image display (video memory). A D/A converter 13 converts data for image display that is stored in the memory 32 into analog signals, and supplies the analog signals to the display unit 28. Image data for display written to the memory 32 is thus displayed by the display unit 28 via the D/A converter 13.

The display unit 28 performs display that depends on the analog signals from the D/A converter 13 on a display device such as an LCD. An electronic viewfinder is realized by digital signals initially A/D converted by the A/D converter 23 and stored in the memory 32 being analog converted in the D/A converter 13, and the analog signals being sequentially transferred to the display unit 28 and displayed. Through-the-lens image display (live view display) can thereby be performed.

A nonvolatile memory 56 is a memory serving as an electrically erasable recordable recording medium, and an EEPROM, for example, is used. Constants, programs and the like for use in operations of the system control unit 50 are stored in the nonvolatile memory 56. Programs as referred to here are computer programs for executing the operations of various flowcharts described later in the present embodiment.

The system control unit 50 is a control unit having at least one processor, and controls the entire digital camera 100. By executing programs recorded on the aforementioned nonvolatile memory 56, the various processing of the present embodiment described later is realized. A RAM is used for a system memory 52. Constants, variables, programs read out from the nonvolatile memory 56 and the like for use in operations of the system control unit 50 are extracted to the system memory 52. The system control unit 50 also performs display control by controlling the memory 32, the D/A converter 13, the display unit 28 and other such components.

A system timer 53 is a timing unit for measuring time that is used in various controls and the time of a built-in clock.

A mode changeover switch 60, a shutter button 63 and an operation unit 70 are operation means for inputting various types of operating instructions to the system control unit 50.

The mode changeover switch 60 switches the operating mode of the system control unit 50 to one of a still image recording mode, a moving image shooting mode, a playback mode and other such modes. Modes of the still image recording mode include an auto shooting mode, an auto scene differentiation mode, a manual mode, an aperture priority mode (Av mode), and a shutter speed priority mode (Tv mode). Also, there are various scene modes configured to shooting scene-specific shooting settings, a program AE mode, a custom mode, and other such modes. With the mode changeover switch 60, any of these modes can be directly switched to. Alternatively, a configuration may be adopted in which after initially switching to a shooting mode list screen with the mode changeover switch 60, one of the plurality of displayed modes is selected, and switching is performed using another operation member. Similarly, the moving image shooting mode may also include a plurality of modes.

A first shutter switch 61 turns ON with a so-called half press (shooting preparation instruction) when a shutter release 63 provided in the digital camera 100 is partially operated, and generates a first shutter switch signal SW1. Operations such as AF (autofocus) processing, AE (auto exposure) processing, AWB (auto white balance) processing and EF (electronic flash) processing are started with the first shutter switch signal SW1.

A second shutter switch 62 turns ON with a so-called full press (shooting instruction) when the shutter release 63 is fully operated, and generates a second shutter switch signal SW2. The system control unit 50 starts the operations of a series of shooting processing from signal readout from the image capturing unit 22 to writing image data to a recording medium 150 with the second shutter switch signal SW2.

By performing an operation for selecting various function icons to be displayed on the display unit 28, the operation members of the operation unit 70 are allocated functions by scene as appropriate, and operate as various function buttons. As for the function buttons, there are, for example, a finish button, a back button, an image send button, a jump button, a stop-down button, an attribute change button, and other such buttons. For example, a menu screen that is variously settable is displayed on the display unit 28 when a menu button is pressed. The user is able to configure various settings intuitively using the menu screen displayed on the display unit 28 and a 4-way (up/down, left/right) directional button and SET button. The 4-way directional button has an up button, a down button, a left button, a right button, and the SET button in the middle.

A controller wheel is a rotatable operation member that is included in the operation unit 70, and is used together with the directional button when instructing a selection item, for instance. When the controller wheel is rotated, an electrical pulse signal is generated according to the rotation amount, and the system control unit 50 controls the components of the digital camera 100 based on this pulse signal. The rotated angle, number of rotations and the like of the controller wheel can be determined by this pulse signal. Note that the controller wheel may be any operation member that is able to detect a rotational operation. For example, the controller wheel may be a dial operation member that itself rotates in response to a rotational operation by the user and generates a pulse signal. Also, the controller wheel may be an operation member consisting of a touch sensor, and may detect rotational movement of the user's finger on the controller wheel (so-called touch wheel), rather than itself rotating.

A power supply control unit 80 is constituted by a battery detection circuit, a DC-DC converter, a switch circuit that switches the block to be electrified and other such components, and detects whether a battery is mounted, the type of battery, and the remaining battery. Also, the power supply control unit 80 controls the DC-DC converter based on the detection results and instructions of the system control unit 50, and supplies a required voltage to various components including the recording medium 150 for a required period.

A power supply unit 30 includes a primary battery such as an alkaline battery or a lithium battery, a secondary battery such as a NiCd battery, a NiMH battery or Li battery, and an AC adaptor. A recording medium I/F 18 is an interface with the recording medium 150, which is a memory card, a hard disk or other such medium. The recording medium 150 is a recording medium such as a memory card for recording shot images, and is constituted by a semiconductor memory, an optical disk, a magnetic disk or other such medium.

A communication unit 54 is connected wirelessly or by cable to external devices, and performs transmission and reception of video signals, audio signals and other such signals. The communication unit 54 is also capable of connecting to a wireless LAN (Local Area Network) and the Internet. The communication unit 54 is capable of transmitting images (including through-the-lens images) captured by the image capturing unit 22 and images recorded on the recording medium 150, and is also able to receive image data and various other information from external devices.

An attitude detection unit 55 detects the attitude of the digital camera 100 relative to the direction of gravity. An image shot with the image capturing unit 22 can be differentiated as being an image shot with the digital camera 100 held horizontally or an image shot with the camera held vertically, based on the attitude detected by the attitude detection unit 55. It is possible for the system control unit 50 to add orientation information that depends on the attitude detected by the attitude detection unit 55 to the image file of an image captured by the image capturing unit 22, and to rotate and record images. As for the attitude detection unit 55, an acceleration sensor, a gyroscope sensor or other such sensor can be used.

Also, in FIG. 2, the information processing apparatus 200 is hardware constituting the image management server 105 and the best shot estimation server 106. Note that the image management server 105 and the best shot estimation server 106 may each be realized by a single information processing apparatus, or may be realized by distributing the various functions among a plurality of information processing apparatuses as needed. In the case of being constituted by a plurality of information processing apparatuses, the apparatuses are connected by a Local Area Network (LAN) or other such communication line so as to be capable of communicating with each other.

In FIG. 2, a system bus 201 connects devices 202 to 209 so as to be capable of communicating with each other. A control unit 202 controls the entire information processing apparatus 200, and is constituted by a Central Processing Unit (CPU), for example. A ROM 203 is a Read Only Memory that stores programs and parameters that do not need to be changed. A RAM 204 is a Random Access Memory that temporarily stores programs and data that are supplied from an external storage device, the network 104 or the like. A HDD 205 is an external storage device including a hard disk or memory card fixedly installed in the information processing apparatus 200 or an optical disk, a magnetic or optical card, an IC card or the like that is removable from the information processing apparatus 200. An NC 206 is a network interface for connecting to a communication line such as the network 104. An input unit 207 is an interface with input devices that receive user operations and input various data, such as a pointing device and a keyboard. A display unit 208 is an interface with a display device such as a display for displaying data that is held by or supplied to the information processing apparatus 200. A GPU 209 is a control unit that is able to perform efficient computational operations by parallelly processing much of the data, and processing performed by the GPU 209 is effective in the case of learning being performed over a plurality of iterations using a learning model such as deep learning.

Note that the following processing of the information processing apparatus 200 is executed by the CPU 202 reading out and starting programs that are supplied from the external storage 205, the network 104 or the like, and controlling various devices in accordance therewith.

Figure 3:
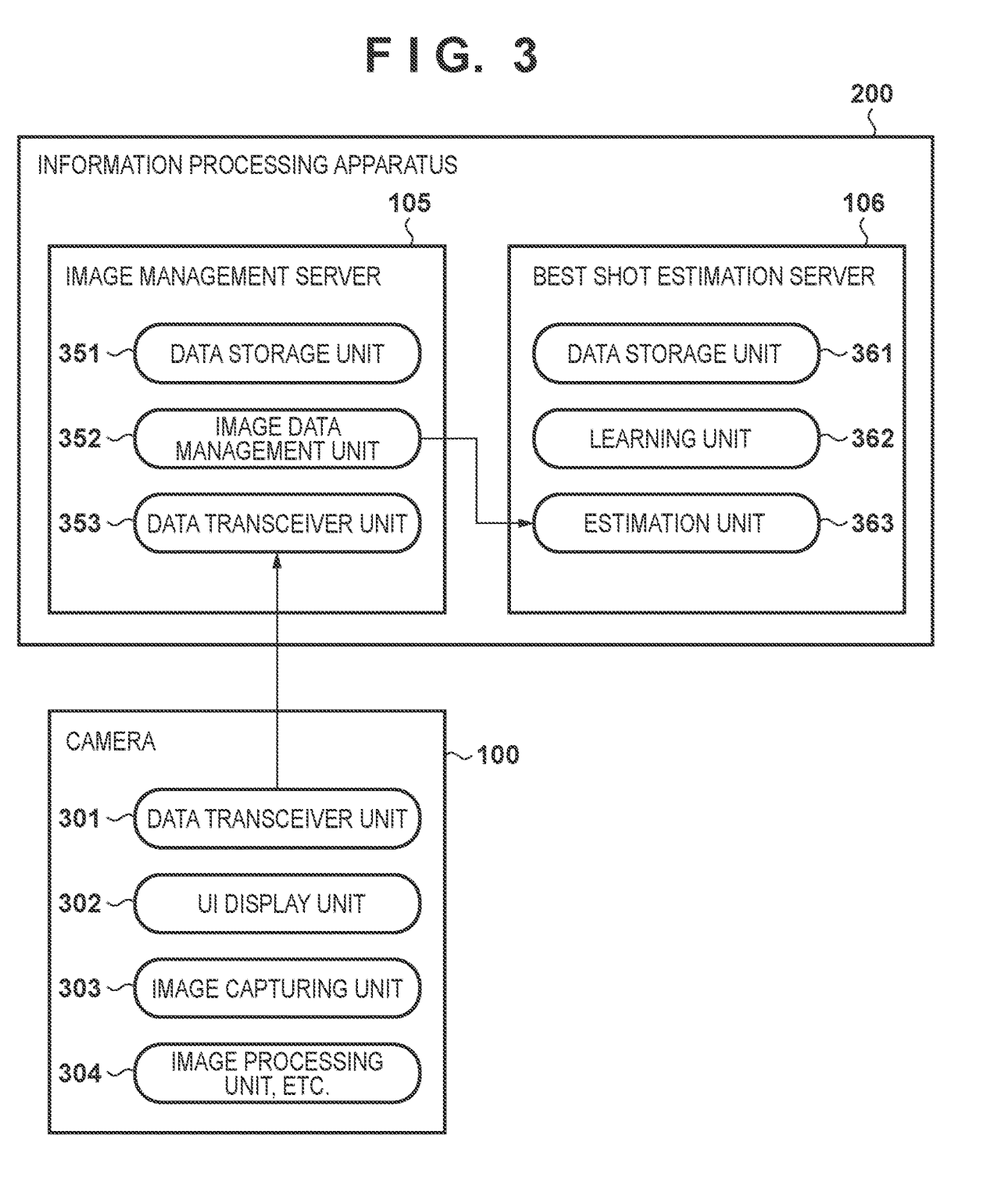
FIG. 3 is a diagram showing a software configuration that is realized by utilizing programs and blocks of the hardware configuration shown in FIG. 2.

FIG. 3 is a diagram showing a software configuration that is realized by utilizing programs and the blocks shown in the hardware configuration diagram of FIG. 2. A data transmission unit 301 transmits image data shot with the camera 100 and supplementary information such as image IDs outside the camera 100. A UI display unit 302 displays images shot with the camera 100 and supplementary information. An image capturing unit 303 performs shooting processing in the camera 100. An image processing unit 304 performs image processing, image sorting processing and other such processing after shooting by the image capturing unit 303.

A data storage unit 351 within the image management server 105 saves images and supplementary information such as image IDs transmitted from the camera 100 side in the ROM 203. An image data management unit 352 manages images that are determined to be best shots by the best shot estimation server 106. A data transceiver unit 353 transmits image data and supplementary information of images to the camera 100 side. A data storage unit 361 within the best shot estimation server 106 stores data that is used by a learning unit 362 in order to estimate best shot images, as per instructions of the GPU 209. An estimation unit 363 is where best shot determination in the best shot estimation server 106 is performed, with this processing being performed by the GPU 209.

The GPU 209 is used in the processing by the learning unit 362 in addition to the CPU 202. Specifically, in the case of executing a learning program that includes a learning model, learning is performed by the CPU 202 and the GPU 209 cooperatively performing computational operations. Note that processing of the learning unit 362 may be performed by only the CPU 202 or the GPU 209. The estimation unit 363 may also use the GPU 209 similarly to the learning unit 362.

Figure 4:
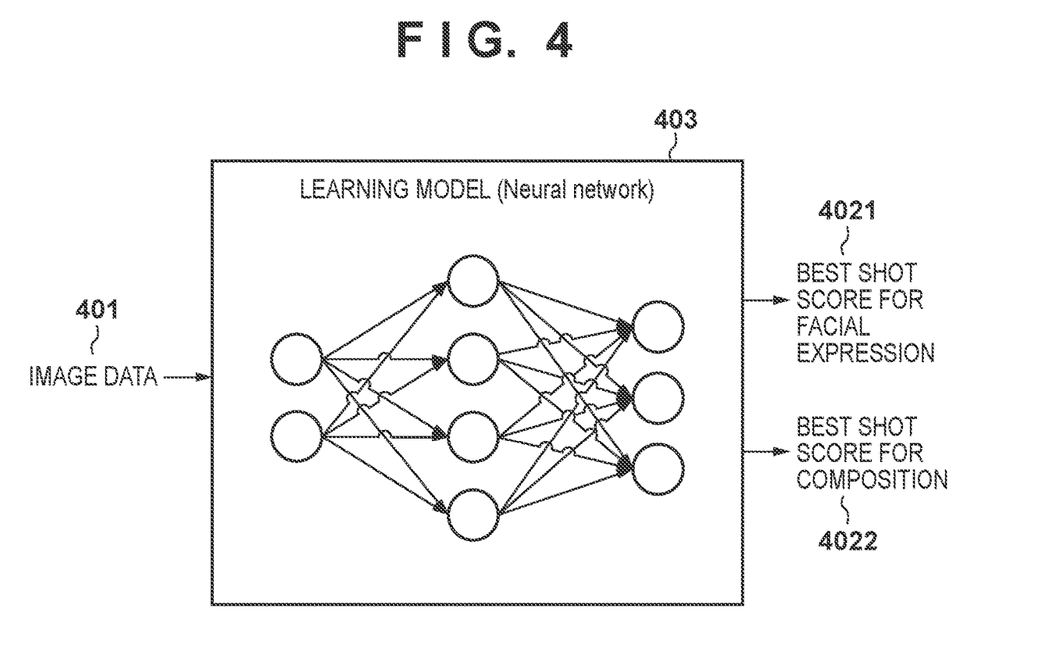
FIG. 4 is a conceptual diagram of a learning model.

FIG. 4 is a conceptual diagram showing an input-output structure that uses a learning model (learning model specialized in facial expression, composition, etc.) in the present embodiment, with input data 401 being image data. Output data 402 is a best shot score value 4021 for facial expression and a best shot score value 4022 for composition, for example.

With regard to the score value, a numerical value from 0 to 1 is output as a probability, and, in the case of facial expression determination, a value approaching 1 is output if the facial expression is estimated as being good. Note that since the details of learning in a learning phase are well-known as described in the aforementioned Japanese Patent Laid-Open Nos. 2010-35177 and 2018-45350, a detailed description thereof will be omitted.

In learning relating to facial expression determination that is performed by best shot determination, images having a good facial expression that are tagged with a high score (evaluation indicating that the facial expression is good), for example, are learned as training data. Also, images having a bad facial expression that are tagged with a low score are learned as training data. Tens of thousands of images are learned in the learning unit 362 using the GPU 209, and thereafter a few thousand test images, for example, are prepared and evaluated, with this learning being repeatedly performed until the accuracy rate is greater than or equal to a predetermined value. This similarly applies to learning of best shot determination relating to composition and to output in an estimation phase.

Figure 5:
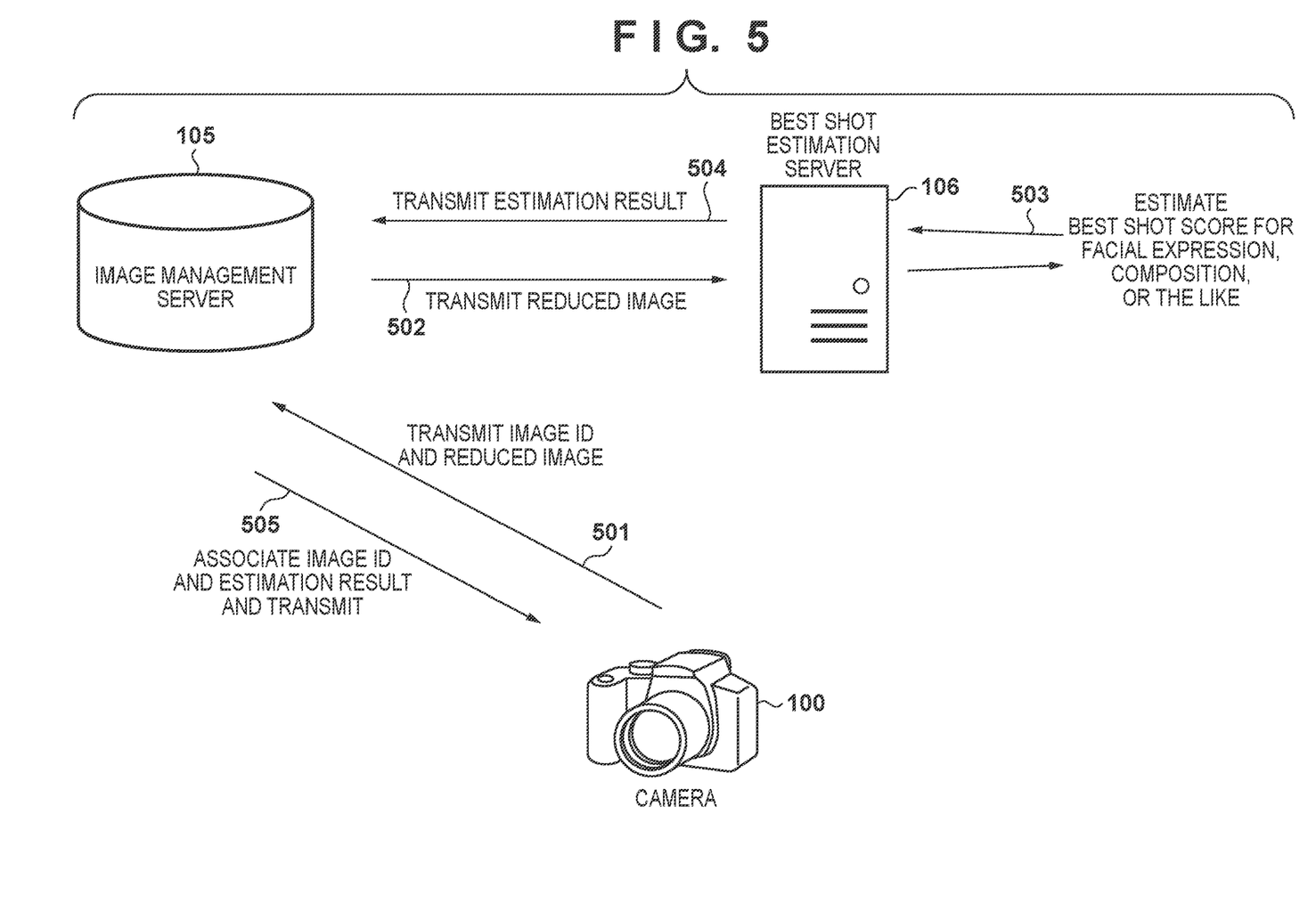
FIG. 5 is a diagram showing the flow of operations of the information processing system.

FIG. 5 is a diagram illustrating operations of a system that utilizes the structure of the learning model shown in FIG. 4. First, the camera 100 transmits image data (thumbnail or reduced image) targeted for evaluation and an image ID related to that data to the image management server 105 (arrow 501). The image management server 105 transmits the image data to the best shot estimation server 106 while at the same time temporarily holding the image ID in the data storage unit 351 (arrow 502). Next, the best shot estimation server 106 calculates best shot score values relating to facial expression, composition and other such elements by using the learning model (arrow 503). The results are then sent to the image management server 105 in return (arrow 504). The image management server 105 transmits the results to the camera 100 in association with the image ID (arrow 505). As a result of the operations shown in FIG. 5 being performed, it becomes possible to derive best shot image score values for facial expression, composition and other such elements which cannot be realized within the camera 100.

Figure 6:
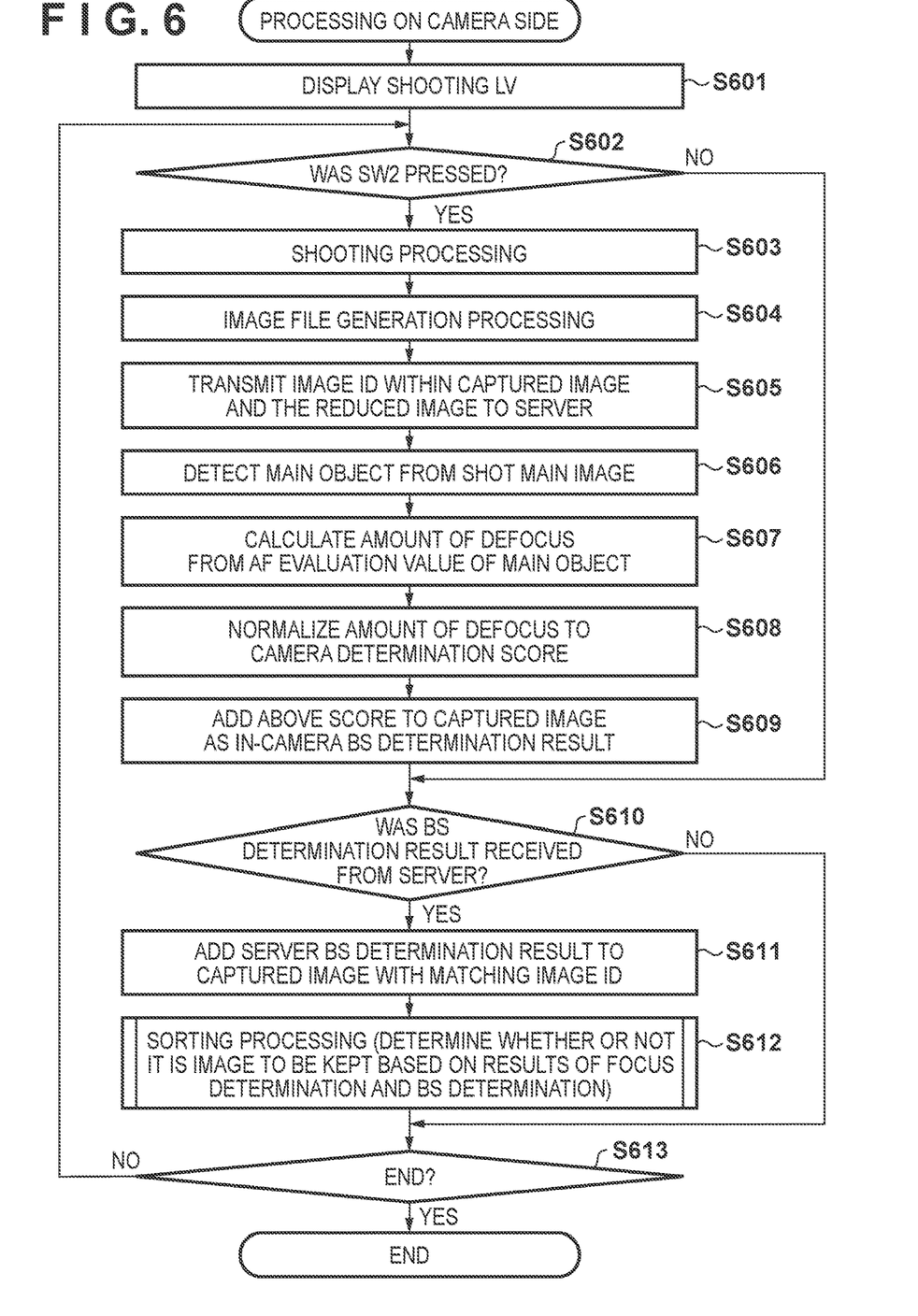
FIG. 6 is a flowchart showing the flow of processing on the camera side.

FIG. 6 is a flowchart of processing on the camera 100 side, with the various processing being realized by programs stored in the nonvolatile memory 56 being extracted to the system memory 52 and executed by the system control unit 50.

In step S601, the system control unit 50 displays image data captured by the image capturing unit 22 (captured image data) on the display unit 28. In other words, a live view screen during shooting is displayed.

In step S602, the system control unit 50 determines whether the shutter release 63 was pressed and the second shutter switch 62 was turned ON, or in other words, whether a shooting instruction was given. The system control unit 50 advances the processing to step S603 if it is judged that the shutter release 63 was pressed, and advances the processing to step S610 if it is judged that the shutter release 63 was not pressed.

In step S603, the system control unit 50 performs shooting processing at the timing at which the shutter release 63 is pressed.

In step S604, the system control unit 50 generates an image file from the image data shot at step S603. The image itself is saved as a main image, and, furthermore, a thumbnail image (smaller size than the main image) is kept within the same file as a display image.

In step S605, the system control unit 50 transmits the image data to the image management server 105 using the communication unit 54 (data transceiver unit 301). At this time, the data that is transmitted is the thumbnail image within the image file generated in step S604. The image ID is also transmitted together with the data of the thumbnail image.

In step S606, the system control unit 50 detects an object from the main image within the image file generated in step S604. The detection processing referred to here involves storing the position of the main object at the time of shooting and extracting the value thereof.

In step S607, the system control unit 50 calculates the amount of defocus (blur) from the AF evaluation value of the main object detected in step S606.

In step S608, the system control unit 50 normalizes the amount of defocus (amount of blur) calculated in step S607 to a camera determination score. Here, normalization involves setting a number from 0 to 100 (normalized to a score out of 100), for example, as an in-camera best shot determination score (evaluation result), with 0 being a highly blurred image and 100 being an unblurred image. In other words, the amount of blur of the main object can be derived.

In step S609, the system control unit 50 tags the image file generated in step S604 with the best shot determination score within the camera 100 of step S608.

In step S610, the system control unit 50 determines whether a best shot determination result from the image management server 105 was received. The system control circuit 50 advances the processing to step S611 if it is judged that a best shot determination result was received, and advances the processing to step S613 if it is judged that a best shot determination result was not received.

In step S611, the system control unit 50 tags the file of the image related to the image ID distributed at the same time with the best shot determination score sent from the image management server 105. Here, the image ID sent at the same time as the thumbnail data in step S605 is received from the image management server 105 in the form of being associated with the best shot determination score. Note that it is also conceivable that the image related to the image ID does not exist in the camera 100 at the point in time at which the image ID is received from the image management server 105. However, since the analysis on the information processing apparatus 200 side and the exchange (transmission and reception) of data are performed using thumbnail images, the processing time is short and the possibility of the image not existing is considered to be low.

In step S612, the system control unit 50 performs image sorting processing. The image sorting processing will be described in detail later using the flowchart of FIG. 8.

In step S613, the system control unit 50 determines whether to end processing by the camera 100. The system control unit 50 ends the camera mode and turns power OFF if it is judged to ends in-camera processing, and returns the processing to step S602 if it is judged not to end in-camera processing.

Note that, in the present embodiment, the system control unit 50 causes the data transceiver unit 301 of FIG. 3 to perform the processing of step S605, causes the image capturing unit 303 to perform the processing of steps S601 and S603, and causes the image processing unit 304 to perform the remaining processing.

Figure 7:
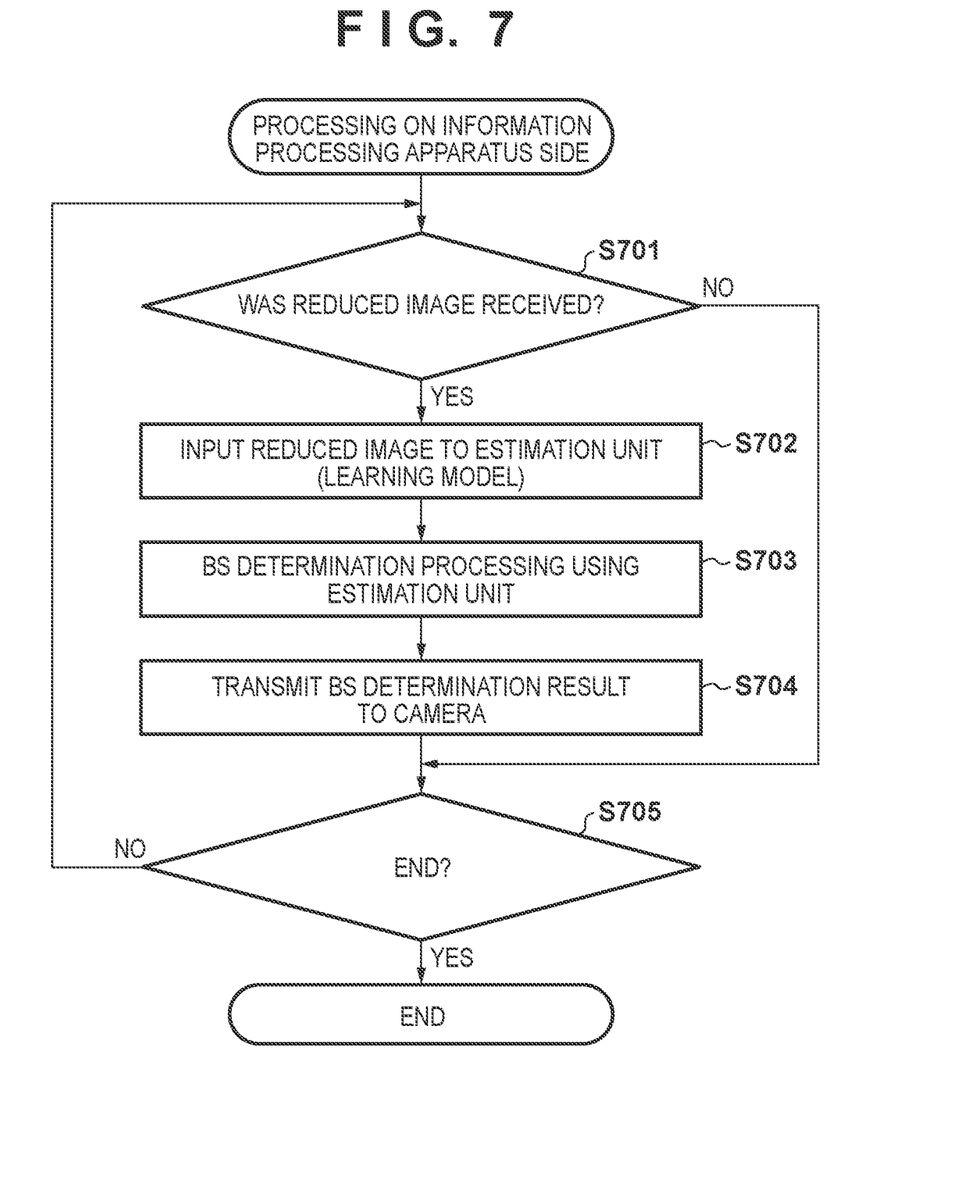
FIG. 7 is a flowchart showing the flow of processing on the information processing apparatus side.

FIG. 7 is a flowchart showing processing (detailed flow in the estimation phase in learning model utilization) on the information processing apparatus 200 side, with the various processing being realized by programs stored in the ROM 203 being extracted to the RAM 204 and executed by the CPU 202.

In step S701, the CPU 202 of the information processing apparatus 200 (hereinafter. CPU 202) determines whether a thumbnail image and image ID transmitted from the camera 100 were received. The CPU 202 advances the processing to step S702 if it is judged that a thumbnail image and image ID were received, and advances the processing to step S705 if it is judged that a thumbnail image and image ID were not received.

In step S702, the CPU 202 inputs the thumbnail image received in step S701 to the estimation unit 363. Also, the image ID received at the same time is held in the data storage unit 361.

In step S703, the CPU 202 performs best shot determination processing with the function of the estimation unit 363 using the GPU 209. The best shot score 4021 for facial expression and the best shot score 4022 for composition (evaluation results), which are outputs from the estimation unit 363, are held in the data storage unit 361.

In step S704, the CPU 202 transmits the image ID that is held at the data storage unit 361 and the best shot scores 4021 and 4022 obtained in step S703 to the camera 100 with the data transceiver unit 353 in association with each other.

In step S705, the CPU 202 determines whether to end the processing. The CPU 202 shuts down the information processing apparatus 200 if it is judged that there is an instruction to end the processing, or in other words, an instruction to shut down the information processing apparatus 200, and returns the processing to step S701 if it is judged that there is not an instruction to end the processing. The CPU 202 then stands by until data transmission is received from the camera 100 side.

Figure 8:
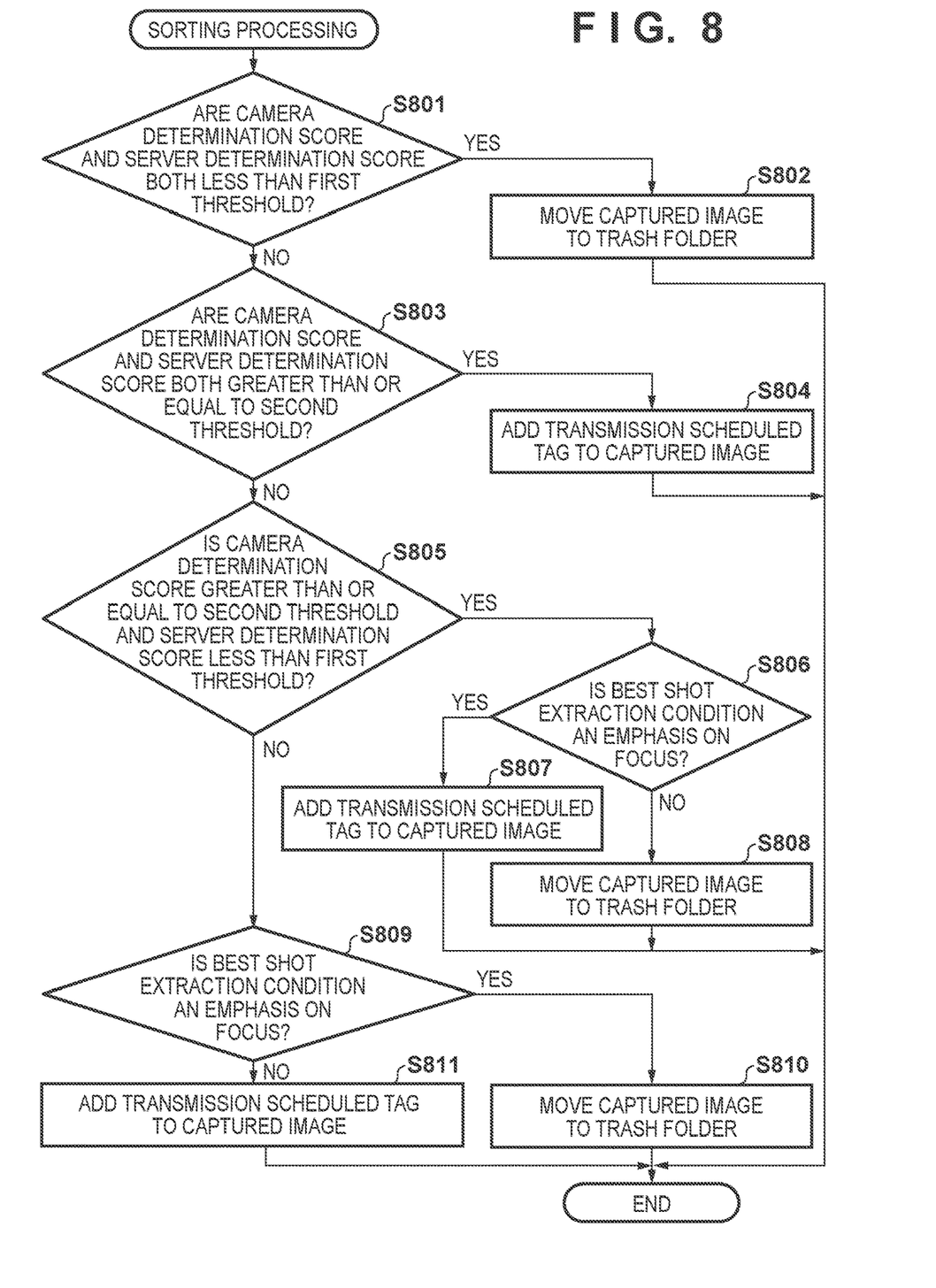
FIG. 8 is a flowchart showing the flow of in-camera sorting processing.

FIG. 8 is a flowchart relating to the image sorting processing on the camera 100 side, the operations of which will be described with reference also to FIGS. 9 and 10. Note that the various processing is realized by programs stored in the nonvolatile memory 56 being extracted to the system memory 52 and executed by the system control unit 50.

In step S801, the system control unit 50 acquired the best shot score value within the camera 100 and the best shot score value of the information processing apparatus 200 for one image from the tag information of the image file, and determines whether the scores are both less than a first threshold value. The system control unit 50 advances the processing to step S802 if it is judged that both scores are less than the first threshold value, and advances the processing to step S803 if it is judged not to be the case.

In step S802, the system control unit 50 sorts the image that was targeted for judgment in step S801 as "an image to be discarded". Here, when it is determined that the image is to be discarded, the system control unit 50 performs separate processing that involves moving the image to a trash folder in the camera 100 or forcibly deleting the image, for example. The sorting processing is then ended.

Here, the specifics of the processing performed in steps S801 and S802 will be described using FIG. 9. FIG. 9 shows a table representing the results of best shot determination within the camera 100 and best shot determination on the information processing apparatus 200 side with respect to five images (images A to E), and further shows how it was determined to sort the respective images.

For example, the image E has a score of 30 in the camera 100 and a score of 20 on the information processing apparatus 200 side. In the case where the first threshold value is 40 in the determination of step S801, the processing will advance to step S802 if the image used in the determination is the image E. Conversely, in the case of the images A to D the processing will advance to step S803.

Since the image E has a low score both in the camera 100 and on the information processing apparatus 200 side, this image has a high possibility of being a failed image. While an image may have worth when the images are visually checked one at a time, it is more efficient to exclude the image E having a low score, in order to extract worthwhile images from a large number of images. Thus, it is determined in step S802 that the image E is an image to be discarded (e.g., to be moved to the trash folder).

In step S803, the system control unit 50 acquires the best shot score value within the camera 100 and the best shot score value of the information processing apparatus 200 for one image from the tag information of the image file, and determines whether the scores are both greater than or equal to a second threshold value. The system control unit 50 advances the processing to step S804 if it is judged that both scores are greater than or equal to the second threshold value, and advances the processing to step S805 if it is judged not to be the case.

In step S804, the system control unit 50 sorts (decides) the image that was targeted for judgment in step S803 as "an image to be kept". Here, when it is determined that the image is to be kept, the system control unit 50 treats the image as an image that is scheduled for automatic backup by, for example, attaching a transmission scheduled tag. The sorting processing is then ended.

Figure 9:
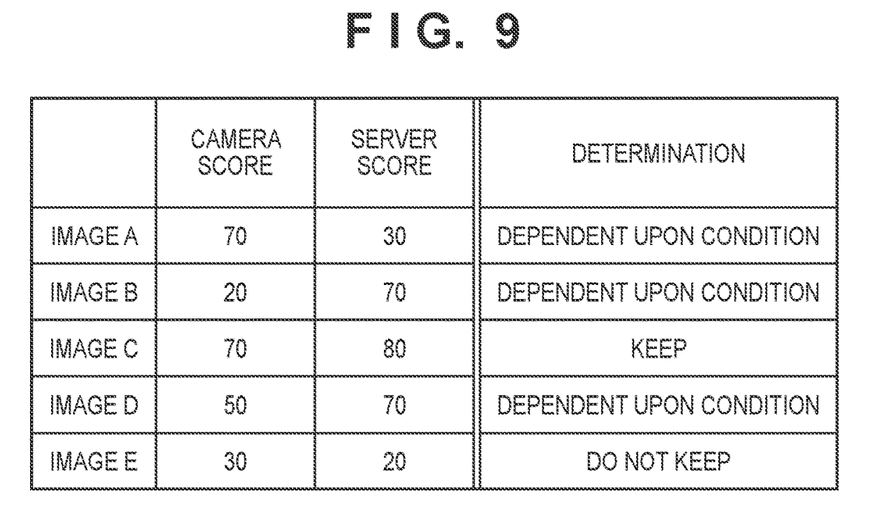
FIG. 9 is a diagram showing an example of images targeted for sorting.
Figure 10:
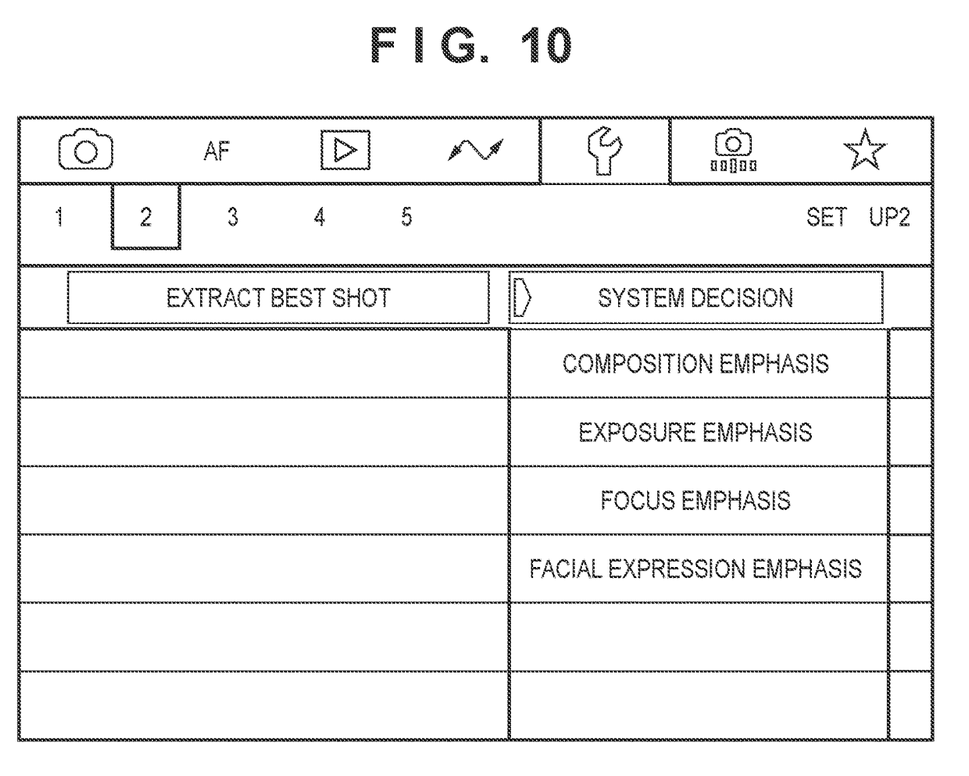
FIG. 10 is a diagram showing a setting screen of image extraction conditions related to sorting processing.

Here, the specifics of the processing performed in steps S803 and S804 will be additionally described using FIG. 9. For example, when the second threshold value is set to 70, the image C is an image for which the processing will advance from step S803 to step S804. Such an image has a high score for the focus (not blurred) determination within the camera 100 and also has a high score for the best shot determination for facial expression and composition performed on the information processing apparatus 200 side, and thus has a high possibility of being a worthwhile image. Thus, it is efficient to sort this image as an image to be kept.

In step S805, the system control unit 50 acquires the best shot score value within the camera 100 and the best shot score value of the information processing apparatus 200 for one image from the tag information of the image file, and determines whether the score on the camera 100 side is greater than or equal to the second threshold value and the score on the information processing apparatus 200 side is less than the first threshold value. The system control unit 50 advances the processing to step S806 if it is judged that the score on the camera 100 side is greater than or equal to the second threshold value and the score on the information processing apparatus 200 side is less than the first threshold value, and advances the processing to step S809 if it is judged not to be the case.

In step S806, the system control unit 50 determines whether the best shot extraction condition is an emphasis on focus (viewpoint that places an emphasis on focus). The system control unit 50 advances the processing to step S807 if it is judged that the best shot extraction condition is an emphasis on focus, and advances the processing to step S808 if it is judged not to be the case.

In the case of FIG. 9, the image A passes through this determination processing of step S806. Here, the best shot extraction condition will be described using FIG. 10. The best shot extraction condition is taken to be a condition that users are able to freely select on a setting screen of the camera 100. For example, a user who considers the first priority to be having the main object in focus may want images to be kept in the sorting even if the composition or facial expression is not that good (content of selection). In that case, it is possible for a desired sorting result to be obtained by the user selecting to place an emphasis on focus on the setting screen of the camera beforehand. On the other hand, since there are also users who want images in which the facial expression is good (e.g., people are smiling or their facial expressions have a certain atmosphere) to be kept even if the focus is not that precise, it is possible for a desired sorting result to be obtained by such users selecting to place an emphasis on facial expression. This is shown with the following processing from step S807.

In step S807, the system control unit 50 sorts the image that was targeted for judgment in step S806 as "an image to be kept", similarly to step S804. The system control unit 50 then treats the image as an image that is scheduled for automatic backup by, for example, attaching a transmission scheduled tag.

In step S808, the system control unit 50 sorts the image that was targeted for judgment in step S806 as "an image to be discarded", similarly to step S802. The system control unit 50 then separately performs processing that involves moving the image to the trash folder or forcibly deleting the image in the camera 100, for example.

In step S809, the system control unit 50 performs similar processing to step S806. In the case of FIG. 9, the images B and D pass through to this determination processing of step S809. The system control unit 50 advances the processing to step S810 if it is judged that the best shot extraction condition is an emphasis on focus, and advances the processing to step S811 if it is judged not to be the case.

In step S810, the system control unit 50 sorts the image that was targeted for judgment in step S809 as "an image to be discarded", similarly to step S802. The system control unit 50 then separately performs processing that involves moving the image to the trash folder or forcibly deleting the image in the camera 100, for example.

In step S811, the system control unit 50 sorts the image that was targeted for judgment in step S809 as "an image to be kept", similarly to step S804. The system control unit 50 then treats the image as an image that is scheduled for automatic backup by, for example, attaching a transmission scheduled tag.

To summarize the processing from step S805, there is a possibility that a user who places an emphasis on focus will want the image A to be kept, whereas a user who places an emphasis on facial expression will want the image A to be discarded. Thus, it is efficient to perform the processing of steps S807 and S808. Note that this similarly applies to the case of the images B and D.

By performing sorting processing in this way, it becomes possible to keep intended images while excluding unwanted images, and it becomes possible to obtain the effect of backing up images without increasing backup data capacity.

Note that a configuration may be adopted in which the order of the aforementioned processing of step S605 and steps S606 to S609 is reversed, and the processing of step S605 is performed, in the case where the score calculated in step S609 is greater than or equal to a predetermined threshold value. As for whether to send images first or to perform best shot determination in the camera 100 first, in the case of wanting to analyze the images as quickly as possible, it is better to perform step S605 first. On the other hand, in the case of valuing analysis of only necessary images over immediacy (when there is a possibility of communication costs being incurred in the case where processing is performed in the information processing apparatus 200, and wanting to keep expenses down), it is effective to defer the processing of step S605. In that case, a configuration need only be adopted in which the score within the camera 100 is determined first, an image having a score value greater than or equal to a predetermined threshold value is transmitted to the information processing apparatus 200, and whether to keep or discard the image is derived in combination with the subsequent score on the information processing apparatus 200 side.

By adopting such a configuration, it becomes possible to keep intended images while excluding unwanted image immediately after shooting, and it becomes possible to obtain the effect of backing up images without increasing backup data capacity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-016493, filed Feb. 3, 2020 which is hereby incorporated by reference herein in its entirety.

What is claimed is:

1. An information processing system comprising an image capturing apparatus and an information processing apparatus capable of communicating with each other,
wherein the image capturing apparatus includes:
an image capturing device configured to capture an object image; and
at least one processor or circuit configured to function as:
a first evaluation unit configured to perform first evaluation on a captured image captured by the image capturing device; and
a first transmission unit configured to transmit the captured image to the information processing apparatus,
wherein the information processing apparatus includes:
at least one processor or circuit configured to function as:
a reception unit configured to receive the captured image transmitted by the first transmission unit;
a second evaluation unit configured to perform second evaluation on the captured image; and
a second transmission unit configured to transmit an evaluation result of the second evaluation to the image capturing apparatus,
wherein the at least one processor or circuit of the image capturing apparatus is configured to further function as a sorting unit configured to receive the evaluation result of the second evaluation, and sort the captured image using an evaluation result of the first evaluation and the evaluation result of the second evaluation, and
wherein a size of an image used in the evaluation by the first evaluation unit is larger than a size of an image used in the evaluation by the second evaluation unit.

2. The information processing system according to claim 1, wherein the sorting unit decides whether to keep or discard the captured image.

3. The information processing system according to claim 1, wherein the evaluation performed by the first evaluation unit is evaluation relating to at least quality of focus.

4. The information processing system according to claim 1, wherein the evaluation performed by the second evaluation unit is evaluation relating to at least quality of composition or facial expression.

5. The information processing system according to claim 2, wherein the sorting unit sorts the captured image whose evaluation result of the first evaluation and evaluation result of the second evaluation are both greater than or equal to a predetermined value as an image to be kept.

6. The information processing system according to claim 2, wherein the sorting unit adds a transmission scheduled tag to the captured image sorted as an image to be kept.

7. The information processing system according to claim 1, wherein the evaluation by the second evaluation unit is performed using a learning model specialized in at least determination of facial expression.

8. The information processing system according to claim 1, wherein the first transmission unit transmits the captured image whose evaluation result of the first evaluation unit is greater than or equal to a predetermined threshold value to the information processing apparatus.

9. An information processing system comprising an image capturing apparatus and an information processing apparatus capable of communicating with each other,
wherein the image capturing apparatus includes:
an image capturing device configured to capture an object image; and
at least one processor or circuit configured to function as:
a first evaluation unit configured to perform first evaluation on a captured image captured by the image capturing device; and
a first transmission unit configured to transmit the captured image to the information processing apparatus,
wherein the information processing apparatus includes:
at least one processor or circuit configured to function as:
a reception unit configured to receive the captured image transmitted by the first transmission unit;
a second evaluation unit configured to perform second evaluation on the captured image; and
a second transmission unit configured to transmit an evaluation result of the second evaluation to the image capturing apparatus, and
wherein the at least one processor or circuit of the image capturing apparatus is configured to further function as:
a sorting unit configured to receive the evaluation result of the second evaluation, and sort the captured image using an evaluation result of the first evaluation and the evaluation result of the second evaluation, and
a selection unit configured to select a viewpoint from which a user places emphasis in the evaluation of the captured image, and
wherein the sorting unit sorts the captured image according to a content of the selection by the selection unit.

10. The information processing system according to claim 9, wherein, in a case where the selection unit performs a selection according to which the user places emphasis on composition or facial expression, the sorting unit sorts the captured image with emphasis placed on the evaluation result of the second evaluation.

11. The information processing system according to claim 9, wherein, in a case where the selection unit performs a selection according to which the user places emphasis on focus, the sorting unit sorts the captured image with emphasis placed on the evaluation result of the first evaluation.

12. An image capturing apparatus capable of communicating with an information processing apparatus, comprising:
an image capturing device configured to capture an object image; and
at least one processor or circuit configured to function as:
an evaluation unit configured to perform first evaluation on a captured image captured by the image capturing device;
a transmission unit configured to transmit the captured image to the information processing apparatus;
a reception unit configured to receive an evaluation result of second evaluation performed on the captured image by the information processing apparatus; and
a sorting unit configured to sort the captured image, using an evaluation result of the first evaluation and the received evaluation result of the second evaluation,
wherein a size of an image used in the first evaluation is larger than a size of an image used in the second evaluation.

13. The image capturing apparatus according to claim 12, wherein the sorting unit decides whether to keep or discard the captured image.

14. The image capturing apparatus according to claim 12, wherein the first evaluation is evaluation relating to at least quality of focus.

15. The image capturing apparatus according to claim 12, wherein the second evaluation is evaluation relating to at least quality of composition or facial expression.

16. The image capturing apparatus according to claim 12, wherein the transmission unit transmits the captured image whose evaluation result of the first evaluation unit is greater than or equal to a predetermined threshold value to the information processing apparatus.

17. The image capturing apparatus according to claim 13, wherein the sorting unit sorts the captured image whose evaluation result of the first evaluation and evaluation result of the second evaluation are both greater than or equal to a predetermined value as an image to be kept.

18. The image capturing apparatus according to claim 13, wherein the sorting unit adds a transmission scheduled tag to the captured image sorted as an image to be kept.

19. An image capturing apparatus capable of communicating with an information processing apparatus, comprising:
an image capturing device configured to capture an object image; and
at least one processor or circuit configured to function as:
an evaluation unit configured to perform first evaluation on a captured image captured by the image capturing device;
a transmission unit configured to transmit the captured image to the information processing apparatus;
a reception unit configured to receive an evaluation result of second evaluation performed on the captured image by the information processing apparatus; and
a sorting unit configured to sort the captured image, using an evaluation result of the first evaluation and the received evaluation result of the second evaluation,
wherein the at least one processor or circuit is configured to further function as a selection unit configured to select a viewpoint from which a user places emphasis in the evaluation of the captured image, and
wherein the sorting unit sorts the captured image according to a content of the selection by the selection unit.

20. The image capturing apparatus according to claim 19, wherein, in a case where the selection unit performs a selection according to which the user places emphasis on composition or facial expression, the sorting unit sorts the captured image with emphasis placed on the evaluation result of the second evaluation.

21. The image capturing apparatus according to claim 19, wherein, in a case where the selection unit performs a selection according to which the user places emphasis on focus, the sorting unit sorts the captured image with emphasis placed on the evaluation result of the first evaluation.

22. An information processing apparatus capable of communicating with an image capturing apparatus, comprising:
at least one processor or circuit configured to function as:
a reception unit configured to receive a captured image captured by the image capturing apparatus and transmitted to the information processing apparatus;
a second evaluation unit configured to perform second evaluation that differs from first evaluation by the image capturing apparatus on the captured image; and a transmission unit configured to transmit an evaluation result of the second evaluation to the image capturing apparatus, wherein a size of an image used in the first evaluation is larger than a size of an image used in the second evaluation.

23. The information processing apparatus according to claim 22, wherein the first evaluation is evaluation relating to at least quality of focus, and the second evaluation is evaluation relating to at least quality of composition or facial expression.

24. The information processing apparatus according to claim 22, wherein the second evaluation is performed using a learning model specialized in at least determination of facial expression.

25. A method of controlling an image capturing apparatus including an image capturing device for capturing an object image and capable of communicating with an information processing apparatus, the method comprising:

performing first evaluation on a captured image captured by the image capturing device;

transmitting the captured image to the information processing apparatus;

receiving an evaluation result of second evaluation performed on the captured image by the information processing apparatus; and sorting the captured image, using an evaluation result of the first evaluation and the received evaluation result of the second evaluation, wherein a size of an image used in the first evaluation is larger than a size of an image used in the second evaluation.

26. A method of controlling an information processing apparatus capable of communicating with an image capturing apparatus, the method comprising:

receiving a captured image captured by the image capturing apparatus and transmitted to the information processing apparatus;

performing second evaluation that differs from first evaluation by the image capturing apparatus on the captured image; and transmitting an evaluation result of the second evaluation to the image capturing apparatus, wherein a size of an image used in the first evaluation is larger than a size of an image used in the second evaluation.

27. A non-transitory computer readable storage medium storing a program causing a computer to execute a method of controlling an image capturing apparatus including an image capturing device for capturing an object image and capable of communicating with an information processing apparatus, the method comprising:

performing first evaluation on a captured image captured by the image capturing device;

transmitting the captured image to the information processing apparatus;

receiving an evaluation result of second evaluation performed on the captured image by the information processing apparatus; and sorting the captured image, using an evaluation result of the first evaluation and the received evaluation result of the second evaluation, wherein a size of an image used in the first evaluation is larger than a size of an image used in the second evaluation.

28. A non-transitory computer readable storage medium storing a program causing a computer to execute a method of controlling an information processing apparatus capable of communicating with an image capturing apparatus, the method comprising:

receiving a captured image captured by the image capturing apparatus and transmitted to the information processing apparatus;

performing second evaluation that differs from first evaluation by the image capturing apparatus on the captured image; and transmitting an evaluation result of the second evaluation to the image capturing apparatus, wherein a size of an image used in the first evaluation is larger than a size of an image used in the second evaluation.

29. A method of controlling an image capturing apparatus including an image capturing device for capturing an object image and capable of communicating with an information processing apparatus, the method comprising:

performing first evaluation on a captured image captured by the image capturing device;

transmitting the captured image to the information processing apparatus;

receiving an evaluation result of second evaluation performed on the captured image by the information processing apparatus;

sorting the captured image, using an evaluation result of the first evaluation and the received evaluation result of the second evaluation; and selecting a viewpoint from which a user places emphasis in the evaluation of the captured image, wherein in the sorting, the captured image is sorted according to a content of the selection in the selecting.

30. A non-transitory computer readable storage medium storing a program causing a computer to execute a method of controlling an image capturing apparatus including an image capturing device for capturing an object image and capable of communicating with an information processing apparatus, the method comprising:

performing first evaluation on a captured image captured by the image capturing device;

transmitting the captured image to the information processing apparatus;

receiving an evaluation result of second evaluation performed on the captured image by the information processing apparatus;

sorting the captured image, using an evaluation result of the first evaluation and the received evaluation result of the second evaluation; and selecting a viewpoint from which a user places emphasis in the evaluation of the captured image, wherein in the sorting, the captured image is sorted according to a content of the selection in the selecting.

* * * * *